Nov. 21, 1967     A. J. ENSOR     3,353,317
PANEL JOINT WITH HOOK-SHAPED BOLT CONNECTING DEVICE
Filed June 17, 1965
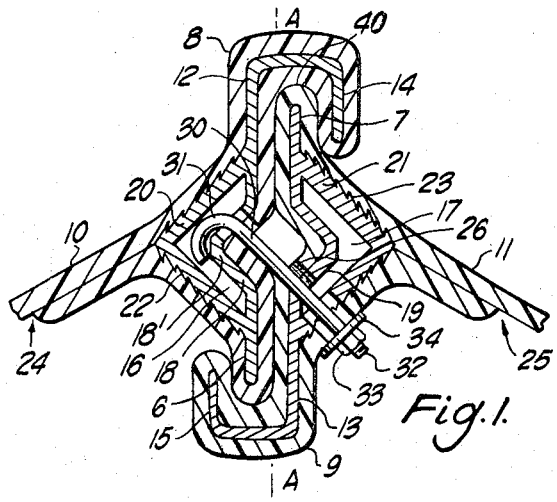
INVENTOR
ARTHUR JOHN ENSOR
By: Fetherstonhaugh &Co.
ATTORNEYS

United States Patent Office 3,353,317
Patented Nov. 21, 1967

3,353,317
PANEL JOINT WITH HOOK-SHAPED BOLT
CONNECTING DEVICE
Arthur John Ensor, 434 Kenwood Ave.,
Ottawa 13, Ontario, Canada
Filed June 17, 1965, Ser. No. 465,256
17 Claims. (Cl. 52—309)

This invention relates to a device for connecting a panel to a structural member, which may comprise another panel, and is particularly adapted for use for panels formed of synthetic material such as fiber glass reinforced plastic or formed with a "skin" of such synthetic material or metal sheet.

It is known in the art to join panels together by turning back adjacent panel edges to form "hooks," which are then interlocked. However, such a construction does not provide a lockable and weather-tight joint.

Another means for joining panels is disclosed in United States Patent No. 2,576,296 of L.B. Green which issued Nov. 27, 1951. This patent shows a joint construction in which adjacent panels are provided with hook elements which are held together by a locking strip which engages the hook elements. A disadvantage of this joint is that the locking strip must be inserted from an end of the joint after the two panels have been brought into abutting relationship. It will be readily apparent that, when attempting to join panels together in a confined space, it may be impossible to gain access to the end of the joint to insert the locking strip.

I have invented a device for joining a panel to a structural member, which strauctural member may comprise another panel, and which device forms a weather-tight seal and can be assembled in a confined space.

The invention comprises a device for securing an edge portion of a panel to a structural member, comprising a first element adapted to be secured to the edge portion of the panel, a second element adapted to be secured to the structural member, said first element having a hook-shaped portion and a hollow portion, said second element having means adapted to engage said hook-shaped portion and said first and second elements being adapted to be fastened together by at least one bolt adapted to pass through said second element and into said hollow portion; said bolt having a first hook-shaped end adapted to engage in said hollow portion and a second threaded end adapted to receive a nut, said nut when tightened urging said first and second elements together.

The said second element may comprise a bracket secured to a structural member such as a wall framework or a further panel.

In the case where two panels are joined together, the first and second members are preferably made integral with the first and second panels respectively. This can most readily be done if the panels are formed of synthetic material such as fiber glass reinforced resin or at least have a "skin" of synthetic material over any suitable core material, e.g., extruded metal or plastic.

In some embodiments the second element is also provided with a hook-shaped portion, and the first element is provided with means adapted to engage with said hook-shaped portion of said second element. In these embodiments, the first and second elements may be substantially identical, which simplifies manufacture since, if the elements are produced by an extrusion process, only one type of die is required.

The connecting device according to the invention may be provided with a rail adapted to support a plurality of rollers, said rollers being adapted to support a movable panel, e.g. a movable roof panel.

To further ensure a weather-tight seal, i.e. to seal out rain, condensation, etc., a layer of resin or other suitable sealant is preferably provided intermediate the first and second elements.

The invention will now be further described in connection with the accompanying drawings, in which:

FIGURE 1 is a cross-sectional view showing a device according to the invention for joining together two "single-skinned" panels;

FIGURE 2 is a cross-sectional view showing a device according to the invention for joining a "single-skinned" panel to a bracket which, in turn, is fastened to a structural support member;

FIGURE 3 is a view partly in section, illustrating an embodiment of the invention for joining two "double-skinned" panels together;

FIGURE 4 is a cross-sectional view illustrating an embodiment of a device for joining two "single-skinned" panels which provides one substantially uninterrupted flat surface;

FIGURE 5 is a cross-sectional view showing an embodiment similar to the FIGURE 1 embodiment but provided with a rail for supporting a plurality of rollers (only one of which is shown), which rollers are adapted to support a movable load, e.g. a movable roof panel or section.

Referring to FIGURE 1, there is shown an embodiment according to the invention whereby two "single-skinned" panels may be joined together. An edge 8 of a first panel 10, which is preferably formed of fiber glass reinforced plastic, is wrapped around a first element 12 having a hook-shaped portion 14. An edge 9 of a second panel 11, which is also preferably formed of fiber glass, is wrapped around a second element 13 having a hook-shaped portion 15. The wrapped around portions of panels 10 and 11 underlap the panels for a suitable distance, e.g. to the points generally indicated at 24 and 25 respectively. The underlapping portions are bonded or otherwise affixed to the overlying panels 10 and 11 which, it will be understood, extend further left and right, respectively, than shown in FIGURE 1. If the panels 10 and 11 are formed of fiber glass they may be readily wrapped around the elements 12 and 13 respectively before the resin of the fiber glass "sets." The element 12 may be formed of suitable metal or plastic by, for example, an extrusion process and has a hollow portion 16 having an inner wall 18 and an outer wall 20. The wall 20 is preferably provided with a toothed outer surface 22 and the upper and lower portions thereof are each at a suitable angle, such as 45° to the vertical axis A—A through the joint in order to provide a gradual change in direction of the wrapped around portion of the panel 10 to ensure good adhesion between panel 10 and element 12. Element 13 may also be formed by an extrusion process and, to simplify manufacturing, may be identical to element 12, in which case only one die is required for extruding elements 12 and 13. Thus, element 13 has a hollow portion 17 having an inner wall 19 and an outer wall 21. The upper and lower portions of wall 21 are also preferably at an angle such as 45° to the vertical axis A—A and are provided with a toothed outer surface 23 in order to provide good adhesion with panel 11.

The hook-shaped portion 14 of element 12 is adapted to engage with the straight portion 7 of element 13 and the hook-shaped portion 15 of element 13 is adapted to engage with the straight portion 6 of element 12.

The joint is fastened together by means of bolts such as bolt 30. Bolt 30 has a hook-shaped end 31 and a threaded end 32 provided with a nut 33 and washer 34. Bolt 30 is passed through a suitable oversized hole 26.

While the hole 26 illustrated in FIGURE 1 does not appear large enough to accommodate hook 31 it is to be understood that the hole 26 may be oversized in the direction transverse to the plane of the cross-section shown in FIGURE 1. For example, hole 26 may be a slot extending in said transverse direction. It should be noted that the hole 26 extends from the underneath side of the device into hollow portion 16 and does not penetrate wall 20 and the overlying top portion of panel 10. Thus the upper surfaces of the panels 10 and 11 and the joint are free from openings which, in the case of roof panels, would admit water, dust, etc. The hooked end 31 of bolt 30 is hooked over the lower part 18' of wall 18 as shown in FIGURE 1. Washer 34 and nut 33 are then tightened on end 32 of bolt 30 to secure the assembly together. It can be seen that the lower portion 18' of wall 18 as viewed in FIGURE 1 extends substantially parallel to the straight portion of bolt 30. Thus as nut 33 is tightened, the hooked end of bolt 30 exerts a force on the lower portion of wall 18, being approximately parallel to the straight portion of bolt 30, can withstand this force without buckling. Before assembly, a suitable sealant such as synthetic rubber is preferably applied to the interface 40 to insure a weather-tight joint.

When the joint is used as a roof panel it is important that bolt 30 and its accommodating hole 26 be on the underside of the device as shown in FIGURE 1 to prevent entry of water, etc., as mentioned previously. Another important weatherproofing feature is the fact that the hook-shaped portion 14 of element 12 forms a protective "cap" over the interface 40 to seal out moisture, etc.

FIGURE 2 illustrates means for attaching a panel 10 to a structural member such as tubing 50 mounted on support member 51. Members 50 and 51 may form part of a wall, framework or of a girder or joint to which it is desired to attach the panel 10 which may be a roof panel. Panel 10 is provided with an element 12 as in the FIGURE 1 embodiment. Structural member 50 has secured thereto a bracket 52 which is preferably of metal and welded to tubing 50 as at 53 and 54. Bracket 52 is formed as shown to engage the tubing 50, the underlapped portion of panel 10, and the hook-shaped portion and the lower portion of element 12. Bracket 52 is provided at suitable intervals along its length with punched offset portions 55. A bolt 30 passes through a suitable oversized hole 26 into the hollow portion 16 where the hooked end 31 hooks onto the lower portion of wall 18 as in FIGURE 1. A nut 33 and washer 34 on the threaded end 32 of bolt 30 secures the assembly together.

FIGURE 3 illustrates an embodiment according to the invention as applied to "double-skinned" panels.

Panel 60 comprises a suitable core material 62 such as honeycomb or foam plastic and an upper skin 64 and a lower skin 66. Upper and lower skins 64 and 66 are preferably formed of fiber glass reinforced resin and are wrapped around element 72 and abut or overlap at 74. Similarly, panel 80 comprises a suitable core material 82 and an upper skin 84 and a lower skin 86. Upper and lower skins 84 and 86 are wrapped around elements 92 and abut or overlap at 88. The elements 72 and 92 are similar to elements 12 and 13 in FIGURE 1 except for slightly different shapes in order to accommodate the thickness of the cores of the panels. As in the FIGURE 1 embodiment, the assembly is held together by a hooked bolt 30 provided with a nut 33 and washer 34, the hooked bolt 30 being passed through oversized or elongated hole 26. The interface 93 is preferably provided with a sealant material as is the interface 40 in the FIGURE 1 embodiment.

Blocks 68 and 69, which may be wood or other rigid material are provided, as shown, for strengthening purposes.

FIGURE 4 shows a modified form of device for joining two "single-skinned" panels which provides a substantially flat undersurface and may be preferable where the joint is not required as a panel stiffener or rail carrier (cf. FIGURE 5).

In FIGURE 4, panel 100 is wrapped around hooked element 102 and is overlapped back a suitable distance to, for example, 104. A panel 101 is wrapped around element 103 and overlapped back to 105. A plurality of bolts such as bolt 30 pass through suitable holes 112 cut in panel 101 and through oversized holes 26 extending through element 103 and into hollow portion 106 of element 102. Bolt 30 has a hooked end 31 and a threaded end 32 provided with a washer 34 and nut 33 to secure the assembly together in the same manner as the FIGURE 1 embodiment. A sealant is preferably provided at interface 110. The threaded ends of the bolts 30 are accommodated in suitable recesses formed at intervals along the underside of element 103. These recesses and the holes 112 can be filled with a suitable filler material after the nuts on the hooked bolts have been tightened in order to provide a smooth, uninterrupted undersurface.

FIGURE 5 shows a device as in FIGURE 1 wherein two panels 10 and 11 wrapped around elements 12 and 13 respectively are held together by hooked bolt 30 passed through oversized hole 26. It is assumed that this assembly forms part of a roof. A rail 120 is secured to the top part of the assembly by means of bolt 122 provided with a washer 124 and nut 126. A plurality of rollers, such as roller 128, are adapted to ride on rail 120. Roller 128 is mounted on an axle 130 mounted in roller housing 132. Housing 132 is adapted to support part of a movable roof section (not shown), it being understood that one or more adjacent and parallel rails would be provided upon which other rollers would ride and provide support for other portions of the movable roof section.

The rail 120 is provided with upstanding flanges 134 and 136 to confine lateral movement of the rollers. The roller housing 132 has turned under portions 138 and 140 adapted to engage with the undersides of flanges 134 and 136 to prevent the roller housing from being lifted off rail 120 which might tend to happen if an updraft of wind "caught" the movable roof section.

The corners of the "hooks" in FIGURES 1 to 5 may be thickened for strengthening purposes in order to ensure that the hooks will not tend to become straightened out if the devices are subjected to stresses.

When any of the embodiments of FIGURES 1 to 5 are used in roof panels, it is important that the bolts 30 and their accommodating holes 26 be located on the underside of the device and for a hook-shaped portion of one of the elements to cover the interface such as interface 110 in FIGURE 4 in order to seal out moisture, etc., as explained in connection with FIGURE 1.

What I claim as my invention is:

1. The combination comprising a panel, a first element secured to an edge portion of the panel, a structural member, a second element connected to said structural member, said first element having a hook-shaped portion and a hollow portion, said second element having means engaging said hook-shaped portion and said first and second elements being fastened together by at least one bolt passing through said second element and into said hollow portion; said bolt having a first hook-shaped end engaging the first element in said hollow portion and a second threaded end provided with a nut, said nut being tightened to urge said first and second elements together.

2. The combination claimed in claim 1 wherein said first element is integral with said panel.

3. The combination claimed in claim 2 wherein said panel is formed of synthetic material.

4. The combination claimed in claim 1 wherein said synthetic material is fiber glass reinforced resin.

5. The combination claimed in claim 1 wherein said second element is a bracket.

6. The combination claimed in claim 1 wherein said structural member comprises a further panel.

7. The combination claimed in claim 6 wherein said second element is integral with said further panel.

8. The combination claimed in claim 1 wherein said second element has a hook-shaped portion and said first element has means engaged with said hook-shaped portion of said second element.

9. The combination claimed in claim 7 wherein said second element has a hook-shaped portion and said first element has means engaged with said hook-shaped portion of said second element.

10. A device as claimed in claim 9 wherein said bolt passes through said second element from its underside and said hook-shaped portion of the first element overlies said means adapted to engage said hook-shaped portion to thereby provide a substantially weather-tight seal between said panels.

11. The combination claimed in claim 9 wherein said first and second elements are substantially identical.

12. A device as claimed in claim 1 and further comprising a rail adapted to be secured thereto and extending along said edge portion, said rail being adapted to support a plurality of rollers, said rollers being adapted to support a movable panel.

13. The combination claimed in claim 1 and further comprising a rail secured thereto and extending along said edge portion, said rail being adapted to support at least one roller.

14. The combination claimed in claim 11 and further comprising a rail secured thereto and extending along said edge portion, said rail being adapted to support at least one roller.

15. The combination claimed in claim 11 and further comprising a layer of sealant intermediate said first and second elements.

16. A device as claimed in claim 1 wherein said bolt has a straight portion and said hollow-portion has an inner wall part of which extends parallel to the straight portion of said bolt and over which said hook-shaped portion engages, said inner wall thereby resisting buckling when said nut is tightened.

17. A device as claimed in claim 11 wherein said bolt has a straight portion and said hollow-portion has an inner wall part of which extends parallel to the straight portion of said bolt and over which said hook-shaped portion engages, said inner wall thereby resisting buckling when said nut is tightened.

References Cited

UNITED STATES PATENTS 2,076,728   4/1937   Keller _____ 52—275

JOHN E. MURTAGH, *Primary Examiner.*